E. THOMSON.
METHOD OF UNITING METAL.
APPLICATION FILED MAR. 14, 1910.

1,022,712.

Patented Apr. 9, 1912.

Witnesses:
Edward M. Jellinek
Irene Lefkowitz

Inventor
ELIHU THOMSON,
By his Attorneys

UNITED STATES PATENT OFFICE.

ELIHU THOMSON, OF SWAMPSCOTT, MASSACHUSETTS, ASSIGNOR TO THOMSON ELECTRIC WELDING COMPANY, OF LYNN, MASSACHUSETTS, A CORPORATION OF MASSACHUSETTS.

METHOD OF UNITING METAL.

1,022,712.   Specification of Letters Patent.   Patented Apr. 9, 1912.

Application filed March 14, 1910. Serial No. 549,098.

*To all whom it may concern:*

Be it known that I, ELIHU THOMSON, a citizen of the United States, and a resident of Swampscott, in the county of Essex and State of Massachusetts, have invented certain new and useful Improvements in Methods of Uniting Metal, of which the following is a specification.

My invention relates to an improved method of uniting an endless rim, margin or frame to its center or body or inclosure and its object is to secure a union of the two by a welding of the one to the other.

Obviously, in the case of an endless rim, margin or frame welded to its body or inclosure, no movement of the one part with relation to the other in the plane of the finished object, such as is required in the case of an ordinary butt-welded joint, is permissible.

One of the objects of my invention is to produce a union which will be as strong and efficient as would be a butt-welded joint if it were possible to make a true butt-weld between a margin or rim and its center or body.

My invention is particularly useful in the manufacture of metal wheels as it permits the union of the tire or rim section to the wheel center and in the case of car wheels permits the use of a mild steel casting center and a rolled high-grade steel tire or rim, thereby producing a wheel such that, should the tire section crack, the wheel will be still held together by the welded union of the disk center or body and rim or tire.

My invention, briefly stated, consists in uniting the rim and the disk or other center by forcing a ring or piece of metal into a space between said rim and center while the parts are heated to plasticity by an electric current, the piece of metal interposed in the space between the rim and disk center being used for completing the circuit between the two while said rim and center are the opposite poles of a circuit carrying welding or heating current furnished by a welding transformer or other source of electric energy.

As my invention is primarily intended for constructing metal wheels such as car wheels, I will describe the same as applied to the manufacture of such objects.

Figure 1:
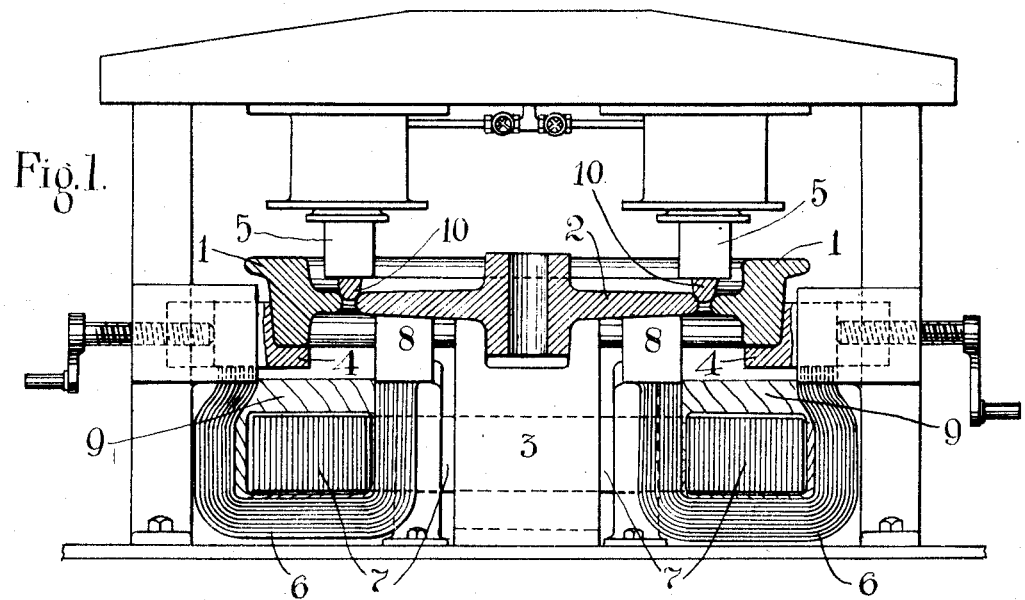
Figure 2:
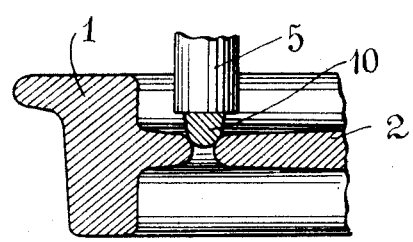
Figure 3:
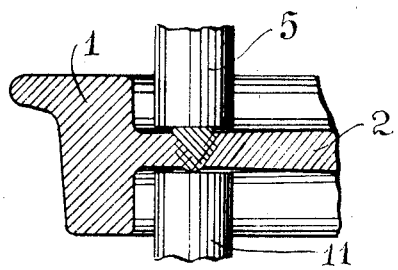
Figure 4:
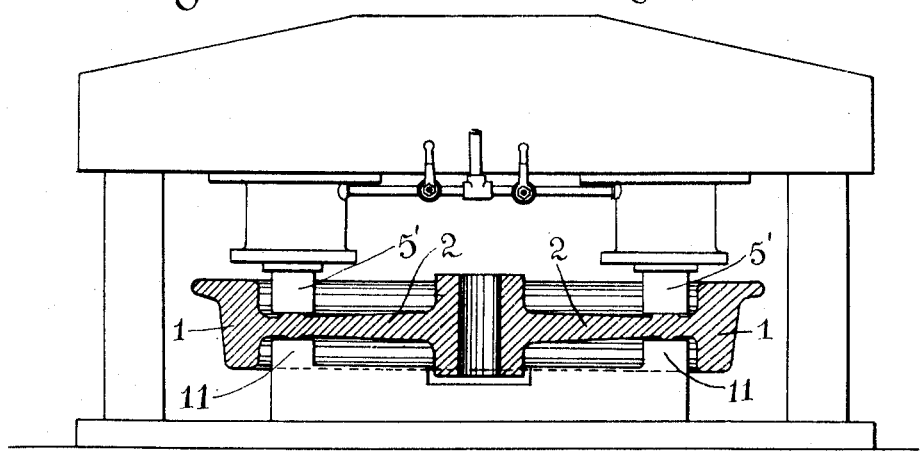

In the accompanying drawings, Figure 1 is a general side elevation of a construction of apparatus that might be employed in carrying out the invention and shows a car wheel in longitudinal section as in process of manufacture. Fig. 2 shows in detail the relation of the parts as assembled at the joint preparatory to the making of the weld. Fig. 3 shows the weld as being completed. Fig. 4 shows a machine adapted for completing the weld during cooling and for the purpose of preventing weakening, due to shrinkage.

Referring to Fig. 1, the rim or tire of a car wheel is shown at 1 and the disk of the center or body at 2. 3 is a support or rest for the center and 4 indicates an annular support preferably made up in segmental sections and adapted to clamp or hold the rim firmly against deformation or loss of circularity. Hydraulically operated plungers of any desired number and form indicated at 5 are employed for forcing the metal into the space between the rim and center while the parts are in plastic condition. The heating of the parts to soften or render the same plastic is preferably effected by the use of a heating electric current which may be supplied from the secondary or secondaries 6 of an annular transformer or transformers, the annular core of a transformer suitable for the purpose being indicated at 7. One terminal of the secondary 6 which latter is preferably of laminated copper and flexible, is indicated at 8, the latter being preferably a block of copper upon which the disk 2 rests near its edge. The opposite terminal of the transformer secondary consists of the rest or support 4 or the segments thereof. The secondary of the transformer is merely indicated at 9.

Blocks 8 are sustained on suitable standards to hold the center 2 firmly when pressure is applied by means of plungers 5 to the ring of metal 10 to force the same into the space between the rim and center. Preferably, said ring is a tapered ring completing the circuit between the rim and center and on the softening of the metal by the welding current is forced downward into the gap and furnishes material for closing up the gap and effecting the weld at the same time between the rim and center. After welding, and while hot, the joint is subjected to a final upsetting lateral pressure during cooling and for the purpose of preventing weakening, due to shrinkage or shrinkage cracks; hammering of course might be employed for the same purpose. This final upsetting lateral pressure after the formation of the weld may be applied by means of a plunger or plungers 5' in a machine such as indicated in Fig. 4, to which the wheel is quickly transferred after welding and while hot, to rest on a preferably continuous abutment 11 directly under the welded portion. The part 5' which is by preference a circular abutment, when driven down by hydraulic means, finishes the weld and being applied during cooling, prevents the weakening or cracks referred to. The plungers 5' being of any desired number and each on its face engaging the wheel, may extend circumferentially around the wheel to any desired distance and so that, if a sufficient number of them be used, the whole circumference of the welded joint may be acted on at the same time. Similarly, each part of the abutment typified at 11 may be of any desired dimension circumferentially of the welded union.

The filling piece 10 is preferably tapered and can, as desired, extend around any section or proportion of the periphery of the center 2 and, as already intimated, it may be a continuous ring. If made in sections, two sections at least could be put in simultaneously and diametrically opposite, or three sections might be put in 120° apart to maintain the centering. In such case, however, it is very desirable that the exterior of the tire portion 2 be fully supported in a circular support surrounding the same to prevent deformation or loss of circularity. By such segmental welding, however, the process is much slower, though the amount of energy output required is reduced. In any case, it is desirable that the tire or rim be well supported and kept to a circular outline, and that the operation be completed in as short a time as practicable to prevent much spreading of heat over the joint. After the welding described, the completed wheel is finally bored out true for its axle. It is, therefore, desirable not to complete the boring operation until the joining is done, so that, when finished, the completed structure shall run true.

What I claim as my invention is:

1. The method of welding a rim or margin to a center consisting in applying a piece of metal over a restricted peripheral space around the center and between the same and the margin, passing a heating electric current between the rim and center while they are the opposite poles of a circuit and through the piece of metal completing the circuit between them and forcing said metal into the restricted peripheral space when the parts become locally softened or heated to the proper welding temperature.

2. The method of uniting a wheel rim and center consisting in applying a tapered ring over a restricted peripheral space around the center and between the same and the rim, passing a heating electric current from one to the other of the two latter parts and through said tapered ring operating to complete the circuit between them and applying lateral pressure to force the ring into said peripheral space and weld the rim and center together.

3. The method of forming and completing a welded union between a wheel rim and center consisting in applying a piece of metal over a restricted peripheral space around the center and between the same and the rim to complete a circuit between them from one to the other, passing a heating electric current from one to the other through said piece of metal and applying lateral welding pressure when said piece of metal and the periphery of said center, together with the inside of the rim, become locally heated to the proper welding temperature by the passage of said current.

4. The method of uniting a metal wheel rim to its center or body consisting in assembling the wheel and rim in the desired finished relation, the two parts being of proper dimensions to leave a narrow peripheral space between them around the center, laying a piece of metal into said peripheral space to electrically bridge the center and rim, passing a heating electric current from one to the other of said center and rim and through said piece of metal to bring them to the welding temperature, forcing the piece of metal into said space by lateral pressure when the parts reach the proper welding temperature and at the same time supporting said rim and center against lateral displacement by the action of the welding pressure.

5. The method of uniting a metal wheel rim to its center or body consisting in applying a piece of metal in a narrow peripheral space around the center and between the same and the rim, passing a heating electric current from one to the other of the center and rim and through said piece of metal to locally heat the same to welding temperature, forcing the piece of metal into said peripheral space by lateral pressure applied to said piece and subsequently subjecting the joint to lateral pressure applied and continued at both sides of the joint to prevent weakening or shrinkage cracks as and for the purpose described.

6. The method of uniting a wheel rim and center consisting in assembling the wheel and rim in finished relation with a narrow peripheral space around the center and between the same and the rim, supporting the rim against deformation in the plane of the finished structure, applying a piece of metal in the said narrow peripheral space, passing a heating electric current from one to the other of the rim and center and through said piece of metal and crowding the latter into the space when the parts are heated locally to the proper welding temperature.

Signed at Lynn in the county of Essex and State of Massachusetts, this 11th day of March, A. D. 1910.

ELIHU THOMSON.

Witnesses:
JOHN A. MCMANUS, Jr.,
ROBERT SHAUD.